H. HENDERSON.
DRAFT RIGGING.
APPLICATION FILED OCT. 17, 1913.

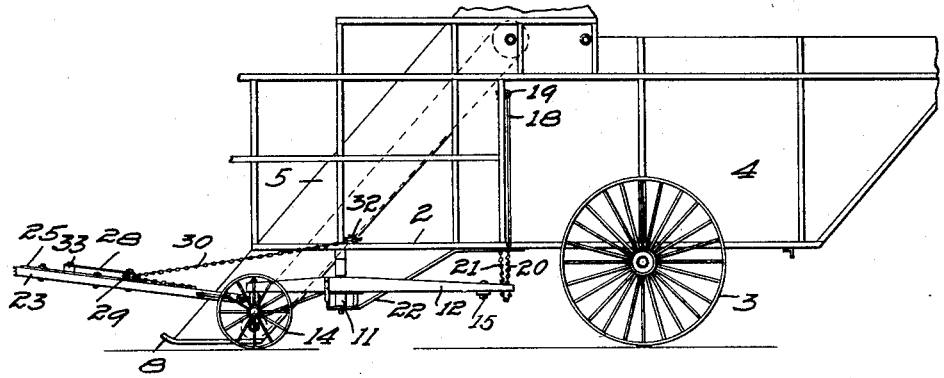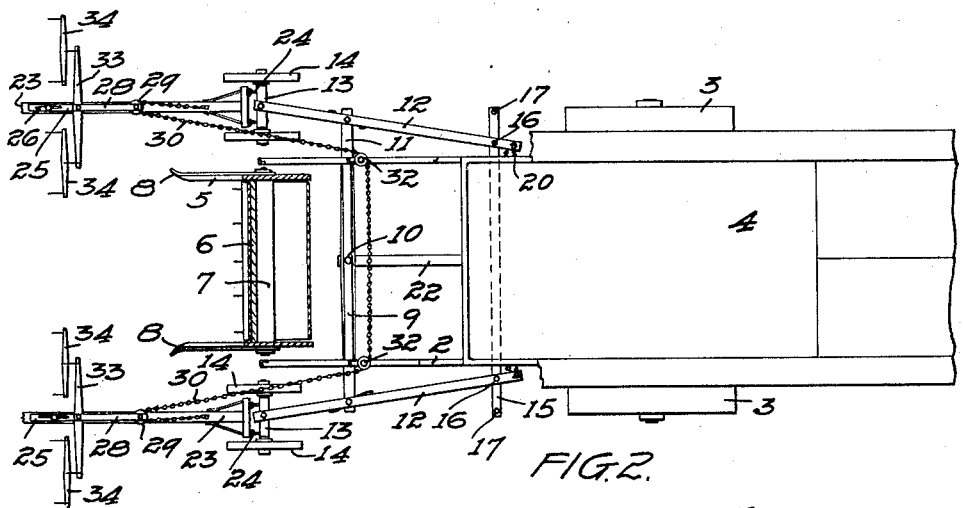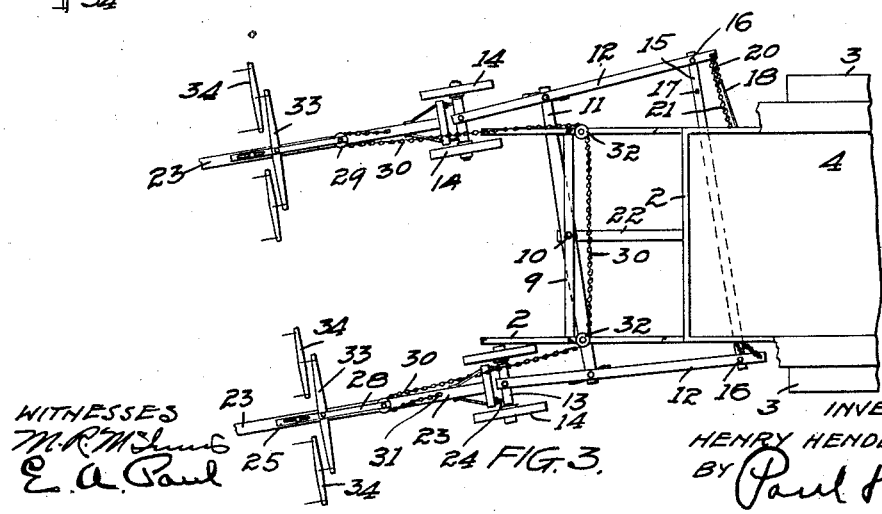

1,105,326.

Patented July 28, 1914.

2 SHEETS—SHEET 2.

WITNESSES

INVENTOR
HENRY HENDERSON
BY
ATTORNEYS

UNITED STATES PATENT OFFICE.

HENRY HENDERSON, OF HALSTAD, MINNESOTA.

DRAFT-RIGGING.

1,105,326.  Specification of Letters Patent.  Patented July 28, 1914.

Application filed October 17, 1913. Serial No. 795,685.

*To all whom it may concern:*

Be it known that I, HENRY HENDERSON, citizen of the United States, resident of Halstad, Norman county, Minnesota, have invented certain new and useful Improvements in Draft-Rigging, of which the following is a specification.

The primary object of my invention is to provide a draft rigging designed particularly for use in connection with a shock loader or similar machine in which the pick-up or gathering mechanism is supported by carrying wheels at the front of the machine.

The object of my invention is to provide a draft rigging arranged to support the forward portion of the pick-up mechanism in such a manner that the contact of the pick-up mechanism with the ground in passing over an uneven field will be prevented.

A further object is to provide a draft mechanism having means for distributing the strain of the load equally between the draft horses upon opposite sides of the machine and preventing the horses on one side from working ahead of those on the opposite side.

Figure 4:
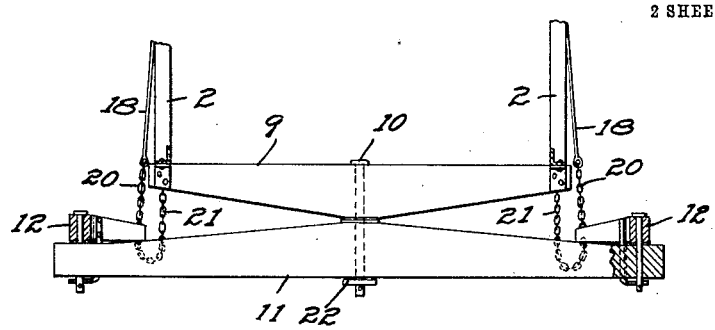
Figure 5:
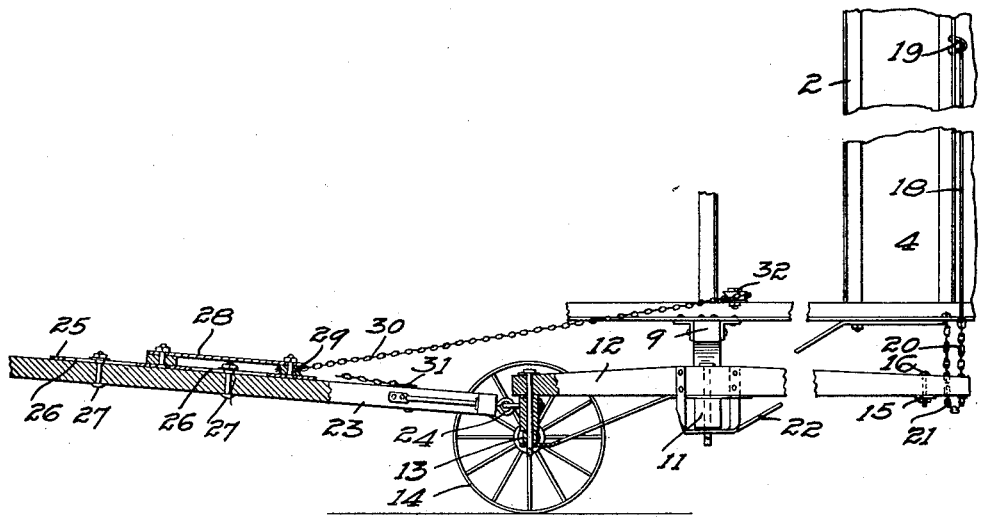
Figure 6:
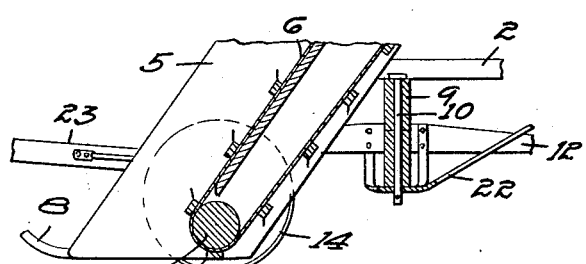

In the accompanying drawings forming part of this specification, Figure 1 is a side view of a shock loader with my invention applied thereto, Fig. 2 is a plan sectional view of the same, Fig. 3 is a detail plan view showing the position assumed by the draft rigging in changing the direction of movement of the machine, Fig. 4 is a detail sectional view showing the manner of mounting the draft rigging upon the machine frame, Fig. 5 is a detail sectional view showing the connection between the draft tongues on the opposite sides of the machine, Fig. 6 is a detail sectional view, showing the relative position of the carrying wheels of the draft rigging and the lower portion of the pick-up elevator.

In the drawing, 2 represents the frame of the loader and 3 the rear carrying wheels supporting the loader box 4. At the forward portion of the machine frame is an elevator frame 5 supporting a pick-up elevator 6 which passes around a roller 7 mounted in the frame 5 near the ground line. Guide arms 8 are provided on the lower portion of the frame 5 for directing the bundles to the pick-up elevator. A rocker 9 supports the frame 2 and a king-bolt 10 passes down through the middle portion of the rocker 9 and through the bolster 11. This bolster extends outwardly on each side beyond the rocker and bars 12 are pivoted at points intermediate to their ends on said bolster. The bars 12 have their forward ends pivotally connected to axles 13 provided with carrying wheels 14, the centers of said wheels being directly above the center of the roller 7, thereby preventing the lower end of the pick-up frame from contacting with the ground in passing over an uneven surface. In other words, the centers of the roller 7 and the truck wheels are in the same vertical plane, and the elevator frame will not contact with the ground, particularly where it is uneven, as would be the case if the truck wheels were located in the rear or the front of the axis of said roller. I regard this arrangement of the truck wheels as an important feature of my invention.

The rear ends of the bars 12 are connected to a cross bar 15, preferably by means of pins 16 fitting into holes 17 in said bar. I prefer to provide two of these holes at each end of the bar 15 and when the pins 16 are inserted into the inner holes the opposite ends of the bars 12 will be spread apart to separate the draft rigging trucks comprising the axles 13 and wheels 14 to a position for traveling across the field to pick up the bundles, as shown in Fig. 2. For moving the machine from place to place on the road I may swing the bars 12 to allow the pins 16 to enter the outer holes in the bar 15. The draft trucks will then be swung toward one another, as indicated in Fig. 3, and the distance between them considerably reduced for convenience in moving the machine on the road.

To limit the outward swinging movement of the bars 12 I prefer to provide rods 18 pivoted at 19 on the frame and having flexible connections, such as chains 20, with the ends of the bar. I also prefer to provide chains 21 connecting the rear ends of this bar with the lower portion of the frame. These flexible connections allow the bars to swing outwardly in turning or changing the direction of movement of the machine, but limit the degree of such movement. A brace 22 is also provided, secured to the under portion of the frame and extending under the bolster 11 and the pin 10. The draft poles or tongues 23 are pivotally connected at 24 to the trucks 13 and upon these poles plates 25 are mounted and have slots 26 slidable on bolts 27 which pass through said poles. Above each plate 25 is a plate 28 between which and one end of the plate 25 a sheave 29 is mounted. Flexible means, such as a chain 30, has its ends secured at 31 to the pole in the rear of the sheaves 29 and has running connections with the sheave 29 and with sheaves 32 on the frame of the machine. Eveners 33 are mounted on the poles between the plates 25 and 28 and are provided with the usual swingle trees 34. When the teams are attached to these swingle trees, the plates 25 and 28 will be moved on the poles and the pull of the team on one pole will be transmitted through the flexible connection 30 to the other pole, equalizing the strain and keeping the draft horses on opposite sides of the machine from getting ahead of one another.

In various ways the details of construction herein shown and described may be modified and still be within the scope of my invention. Such features as the pivoted frame connected to the trucks and the bar extending across from one side to the other of said frame at the rear may be changed without altering materially the operation of the machine.

I claim as my invention:—

1. The combination, with a frame, of draft trucks arranged upon each side thereof, draft tongues for said trucks, means pivotally connecting said trucks with said frame, and flexible means connected to said tongues and having running connections with said frame.

2. The combination, with a wheeled frame having a pick up at its forward end, of a pair of draft trucks arranged upon each side of said frame, the axes of said trucks coinciding substantially with the axis of said pick up, said trucks having draft tongues and means connecting said trucks with said frame.

3. The combination, with a wheeled frame, of draft trucks arranged upon each side of said frame, draft tongues for said trucks, a flexible equalizing means attached at its ends to said tongues respectively and having running connections with said wheeled frame, and eveners slidably mounted on said tongues and having running connection with said equalizing means.

4. The combination, with a wheeled frame, of a bolster projecting on each side of said frame, bars pivotally mounted on the projecting ends of said bolster and extending in the front and rear thereof, means adjustably connecting the rear ends of said bars across said frame, and draft trucks pivotally connected with the forward ends of said bars, the adjustable connections between the rear ends of said bars permitting said trucks to be moved inwardly or outwardly with respect to said frame.

5. The combination, with a wheeled frame, of a bolster whereon the forward portion of said frame is pivoted, said bolster being free to swing horizontally beneath said frame, bars pivoted at a point intermediate to their ends on said bolster, trucks pivotally connected with the forward ends of said bars and having draft tongues, means connecting the rear ends of said bars across said wheeled frame, and a flexible equalizing means attached to said tongues and having a running connection with said frame.

6. The combination, with a frame, of a draft rigging comprising a pair of trucks disposed upon opposite sides of said frame, said trucks having draft tongues, and flexible means attached to said tongues and having running connections with said frame.

7. The combination, with a wheeled frame, of a draft rigging including a bolster pivotally connected to said wheeled frame and extending transversely thereof, and carrying trucks arranged upon each side of said frame and pivotally connected with said bolster and having draft tongues, and flexible means attached to said tongues and having running connections with said wheeled frame.

8. The combination, with a frame having carrying wheels, of bars arranged upon each side of said wheeled frame, a bolster pivotally connected with said wheeled frame and with said bars, a transverse bar pivotally connected with said side bars and parallel with said bolster, draft trucks pivotally connected with said side bars upon each side of said frame and having draft tongues, said bolster and said transverse bar maintaining a parallel relation during the oscillation of said side bars when changing the direction of travel of the machine.

9. The combination, with a wheeled frame, of trucks arranged upon each side of said frame, means supporting said frame on said trucks, draft tongues for said trucks, and flexible means connected to said draft tongues and having running connections with said frame.

In witnesses whereof, I have hereunto set my hand this 13" day of October, 1913.

HENRY HENDERSON.

Witnesses:
G. O. BENSON,
FRED J. GODE.

Copies of this patent may be obtained for five cents each, by addressing the "Commissioner of Patents, Washington, D. C."